Jan. 23, 1923.
J. W. ELARDO.
AUTO SAFETY SIGNALING DEVICE.
FILED JULY 15, 1921.
1,443,251.
3 SHEETS—SHEET 1.
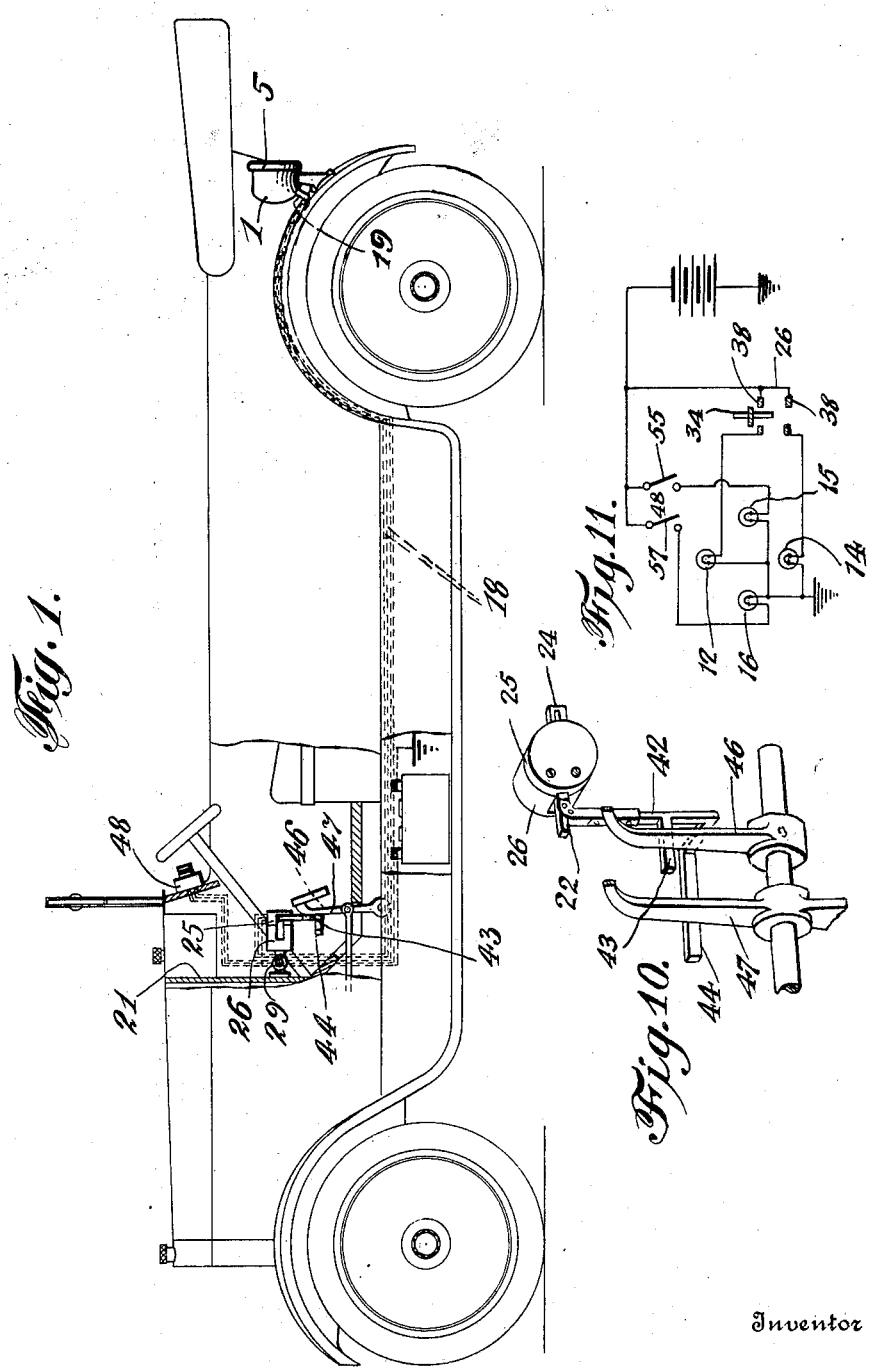
Inventor
Joseph W. Elardo
By Fetherstonhaugh & Co
Attorney Jan. 23, 1923.
J. W. ELARDO.
AUTO SAFETY SIGNALING DEVICE.
FILED JULY 15, 1921.
1,443,251.
3 SHEETS—SHEET 2.
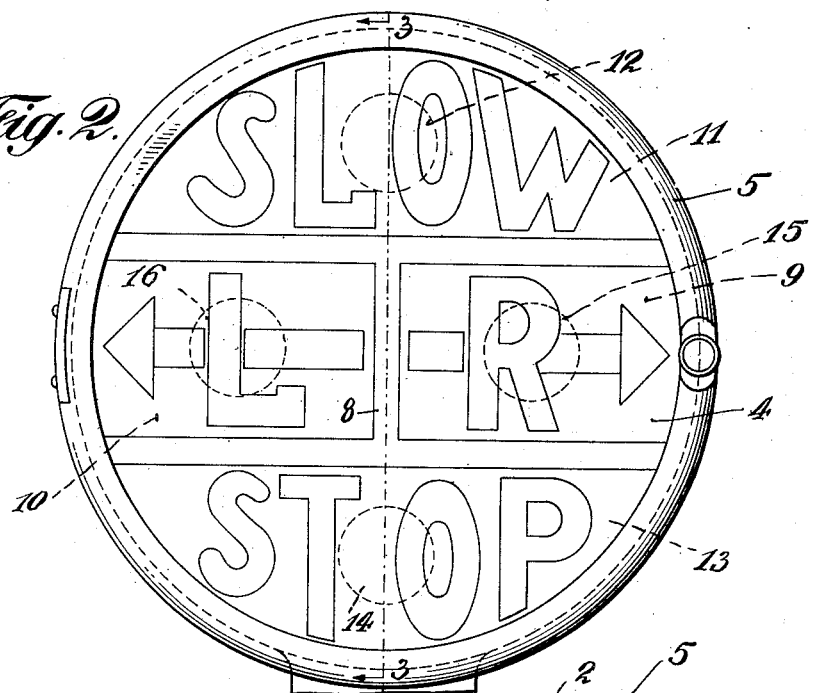
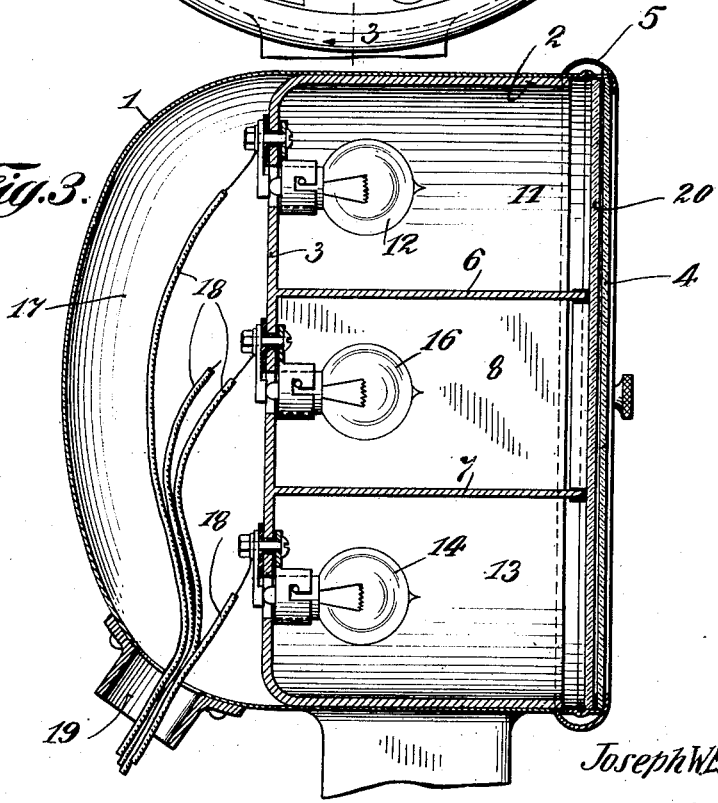
Inventor
Joseph W Elardo
By Fetherstonhaugh & Co.
Attorney Jan. 23, 1923.
J. W. ELARDO.
AUTO SAFETY SIGNALING DEVICE.
FILED JULY 15, 1921.
1,443,251.
3 SHEETS—SHEET 3.
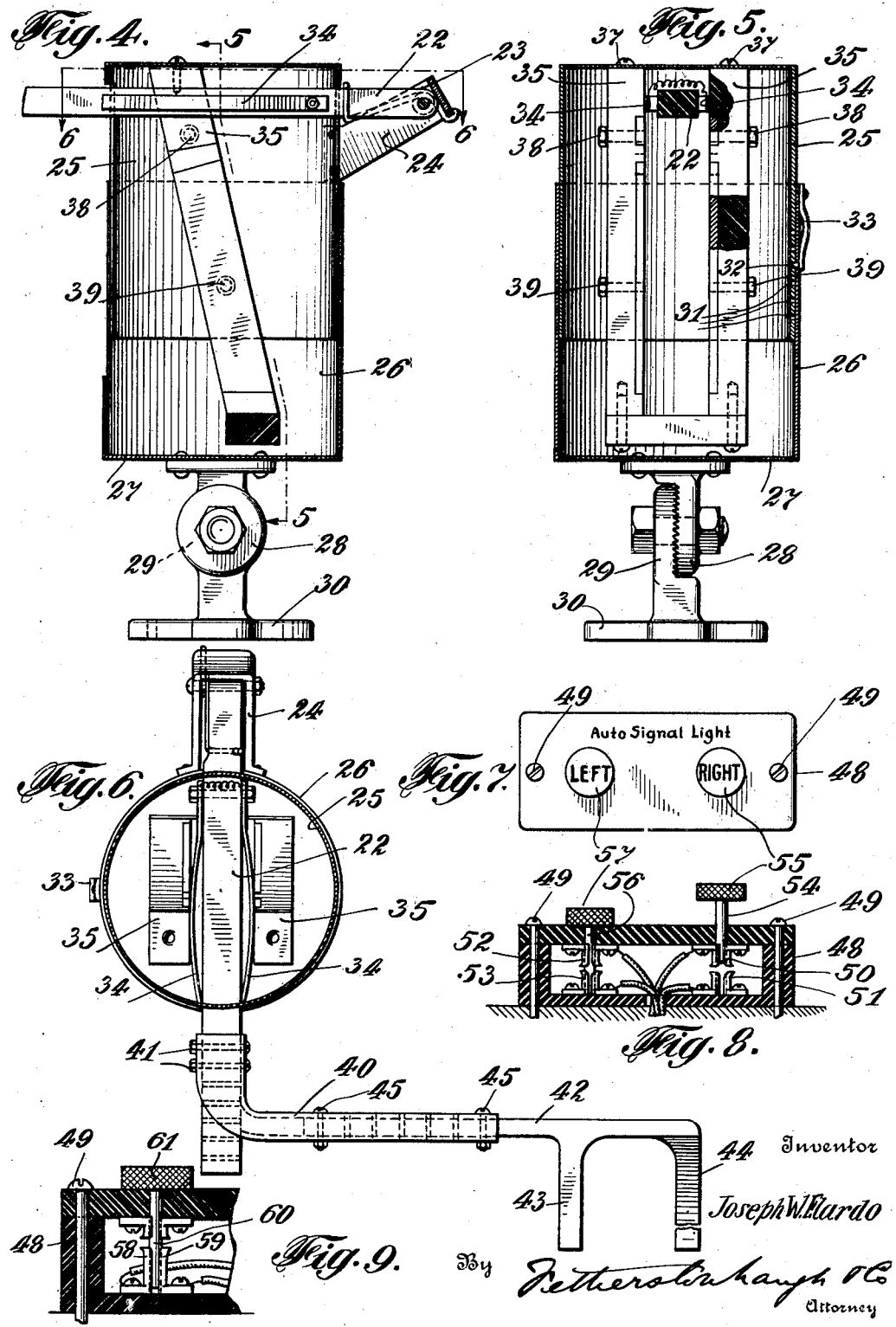

Patented Jan. 23, 1923.

1,443,251

UNITED STATES PATENT OFFICE.

JOSEPH W. ELARDO, OF FREDONIA, NEW YORK

AUTO SAFETY SIGNALING DEVICE.

Application filed July 15, 1921. Serial No. 484,989.

*To all whom it may concern:*

Be it known that I, JOSEPH W. ELARDO, a citizen of the United States, residing at Fredonia, New York, have invented certain new and useful Improvements in Auto Safety Signaling Devices, of which the following is a specification, reference being had to the drawings, which form a part of this specification.

This invention relates to rear signaling means for motor vehicles whereby traffic indications may be given following vehicles, and my improvement is directed to a rear lamp which is divided into four separate compartments, each containing a separate source of light, and all enclosed at the lamp front with a glass cover bearing legends which respectively indicate the intention of the driver to slow down, to stop, or to turn to the right or left.

Each source of light is energizable by a different electrical circuit, whereof the circuits representing the "Slow" and "Stop" legends are automatically controlled with the operation of the brake pedal, the slow signal is automatically controlled with the operation of the clutch release pedal, and the circuits representing the right and left turn legends are respectively actuated by separate push buttons, located within convenient access on the dash board.

Other features and advantages of my invention will hereinafter appear.

In the drawing:—

Figure 1 is a side elevation of an automobile partly broken away to show the installation of the signal control mechanism.

Figure 2 is an enlarged front view of a rear lamp showing the arrangement thereon of the traffic indications.

Figure 3 is a section through the line 3—3 of Figure 2.

Figure 4 is a side elevation of the switch organism actuable by the brake and clutch pedals.

Figure 5 is a section on the line 5—5 of Figure 4.

Figure 6 is a top view of Figure 5, with the yoke attachment to co-act with the brake and clutch pedals.

Figure 7 is a front view of the switch having the push buttons to control the right and left signals.

Figure 8 is a section through said switch box, and

Figure 9 is a partial view of a modified form of switch.

Fig. 10 is an enlarged perspective view more clearly showing the brake and clutch pedal levers and their operative relation with the switch mechanism, and Fig. 11 is a wiring diagram.

In carrying my invention into effect I provide a lamp of novel construction, having an outer shell 1 which is intended to be used as a tail light for motor vehicles. This shell contains a cylindrical casing 2, having a rear plate 3, and provided at its front portion with a glass covering 4, that is connected to the casing by the rim member 5 in the usual manner. The casing is divided into four compartments by means of the horizontal partitions 6 and 7 and the vertical partition 8, which subdivides the central compartment into two chambers 9 and 10.

The upper left hand chamber 11 contains a bulb 12, the lower chamber 13 a bulb 14, and the chambers 9 and 10 respectively contain the bulbs 15 and 16.

The lamp is provided, behind the rear plate 3, with a space 17 which is formed by an extension of the shell 1, said space serving to concealingly contain the circuit wires 18 which respectively supply current to the several bulbs, the circuit wires entering said space by means of an opening 19.

Lying within the glass covering 4 there may be a glass plate or disc 20, upon which there are disposed, by suitable means, legends to indicate the various signals which it is the purpose of my invention to visualize. Thus, for example, the word "Slow" may appear upon the plate 20 at its upper portion representing the exposed part of space 11; the word "Stop" may appear upon the plate 20 and represent the exposed portion of compartment 13, and the letter "R", with an arrow pointing to the right, may represent the exposed portion of the intermediate chamber 9; while the letter "L", with an arrow pointing to the left, may represent the exposed portion of the chamber 10.

It is intended that, by whatever means these legends are disposed upon plate 20, the legends referred to will appear in an illuminated manner when the respective bulbs are energized.

For the purpose of closing the separate circuits for the respective bulbs, I provide a switch organism which is located upon the motor vehicle, where it may be mounted upon the dash board 21, or otherwise conveniently disposed for operation.

The switch organism comprises a switch bar 22, pivoted at 23 to a bracket 24 that extends from a cylindrical member 25 that is in telescopic relation with another cylindrical member 26. The member 26 is provided, at its outer closed end 27 with a joint member 28 that has means of adjustable engagement with another joint member 29, which has a base flange 30 whereby the entire switch organism may be attached to the dash board 21, the joint 28, 29 enabling vertical adjustments to be effected for use with motor vehicles of different makes.

The telescopic assembly of the members 25, 26 is also for adjustment purposes, enabling the cylindrical structure to be extended or contracted, and to lock these members 25, 26 in a lengthwise adjusted position the members 26 and 25 are provided with holes 31 adapted to engage a detent 32 carried by a spring arm 33 that is mounted on member 26.

The switch bar 22 is provided, on opposite sides, with flat springs 34, 34, secured thereto, as by riveting, at each end, the springs being outwardly bowed in order that they may engage frictionally, under tension, with the opposite, inner surfaces of insulation walls 35, 35, which are secured to the outer, closed end 25 of member 25, as by screws 37.

Exposed upon the inner surfaces of walls 35, 35, are pairs of opposite contacts 38, 39, which comprise the terminals, respectively, for the circuit wires 18 that supply current to the bulbs 12 and 14.

The switch bar 22 is intended to be swung downwardly under the influence of either the brake or clutch pedals, in the operation thereof. In the first part of this downward swing, under the influence of the brake pedal, the switch bar, meeting contacts 38, closes the circuit for bulb 12, thereby causing the indication "Slow" to be illuminated as a signal to a following vehicle, but, the continued depression of the brake pedal, to put the brakes on hard, will have the effect of moving switch bar 22 into engagement with contacts 39, thereby closing the circuit for bulb 14, which causes the indication "Stop" to be illuminated as a signal.

The means of connection between the switch bar 22 and the pedals are as follows:—

An angular member 40 has one arm slidable upon the free end of switch bar 22, to be in lengthwise adjustment relative thereto, engaging means, as bolts 41, serving to secure these members in their adjusted relation; and said member 40 is in slidable relation with a member 42, that has the yokelike arms 43, 44, engaging means, as bolts 45, serving to secure member 42 in lengthwise adjustable relation therewith.

The yoke arms 43, 44, under the adjustment means provided, are enabled to lie rearwardly of the brake pedal 46 and clutch pedal 47, respectively in positions to be engaged and actuated by said pedals when the latter are depressed, to thereby operate the switch bar 22. The arm 43 is shown in Figure 1 as normally in contact with the lever for brake pedal 46, so that the first portion of the depressing movement of this pedal in applying the brakes to slow down the speed of travel will cause the switch bar 22 to move into engagement with contacts 38, while the full down stroke of pedal 46, to apply the brakes hard, will cause the switch bar to be moved into engagement with contacts 39. The yoke arm 44 is bent forwardly (i. e., in the direction of the dash) in order that the clutch pedal 47, in the first portion of its operative movement, will not take effect thereon, because when the clutch is eased for the purpose of shifting gears it is not necessary to operate the signals but when the clutch pedal 47 is depressed fully to release the clutch, it engages yoke arm 44 in such act, thereby actuating the switch bar and moving it into engagement with contacts 38 to illuminate the "Slow" signal.

The switch mechanism, shown in Figures 7 and 8 for the actuation of the signal indications for turning to the right or left, includes a casing 48, mounted on the dash 21 as by bolts 49. Within said casing are secured the opposed, separated switch elements 50, 51 and 52, 53, the elements 50, 51 respectively constituting opposite terminals for the circuit by which bulb 15 is energized, and the elements 52, 52 respectively constituting opposite terminals for the circuit by which bulb 16 is energized. A plunger 54, having push button 55 is provided to co-act with the switch elements 50, 51, and, similarly, a plunger 56, having push button 57, is provided to co-act with the switch elements 52, 53. By means of these push buttons the driver may cause either right turn indication, "R" with an arrow pointing to the right; or the left turn indication, "L" with an arrow pointing to the left to be illuminated.

In the modified form of switch mechanism shown in Figure 9 the switch elements comprise a divided socket whose parts 58, 59, are each a circuit terminal, and the plunger 60, having push button 61 closes the circuit between said terminals.

Variations within the spirit and scope of my invention are equally comprehended by the foregoing disclosure.

I claim:—

1. The combination with a motor vehicle having clutch and brake members, of means operable by the brake member to successively present slow and stop signals, said means permitting operation of the slow signal only by the clutch member.

2. The combination with a motor vehicle having a brake pedal and a clutch pedal, of light signaling means including "Slow" and "Stop" indications, electric circuits therefor, and means operable by the brake pedal to successively energize the circuits for the "Slow" and "Stop" indications, said means also actuable by the clutch pedal to energize only the circuit for the "Slow" indication.

3. In a signaling system for motor vehicles, including separate light exposures indicating respectively slow speed and stop, a bulb for each exposure and a separate electrical circuit for each bulb, a switch organism including a lever whose path of movement causes it to successively close the circuits for the slow speed and stop indications, and yoke arms engaging said lever to operate it, said yoke arms disposed respectively in the paths of movement of the brake and clutch pedals, for actuation thereby, but the clutch pedal communicating its motion for operation of the slow signal only.

4. In a signaling system for motor vehicles, including separate light exposures indicating respectively slow speed and stop, a switch organism for said exposures comprising a lengthwise adjustable casing, angularly adjustable means whereby said casing may be mounted on the dash board of a vehicle, a switch bar mounted on said casing, and means adjustably engaging said switch bar to be in the paths of movement of the vehicle brake and clutch pedals, whereby the operation of the pedals may serve to actuate the switch bar.

5. In a signaling system for motor vehicles, including separate light exposures indicating respectively slow speed and stop, a switch organism for said exposures comprising a two part telescoping casing, means for securing the parts of said casing in an adjusted length thereof, a mount for connecting said casing to the dash-board of a vehicle, means of angular adjustment between said mount and casing, a switch bar mounted in said casing, and adjustable means engaging said switch bar to be in the paths of movement of the vehicle brake and clutch pedals, whereby the operation of the pedals is communicated to the switch bar, to actuate it.

6. In a signaling system for motor vehicles including separate light exposures indicating respectively slow speed and stop, a switch organism for said exposures comprising a lengthwise adjustable casing, angularly adjustable means whereby said casing may be mounted on the dash board of a vehicle, a switch bar mounted in said casing, a yoke-like member having arms lying respectively in the paths of the clutch and brake pedals, for actuation thereby, and an angular connecting member having one arm in adjustable engagement with the switch bar and its other arm in adjustable engagement with the yoke-like member.

Signed at Fredonia, in the county of Chautauqua, and State of New York, this 9th day of July, 1921.

JOS. W. ELARDO. [L. S.]